US008861885B2

(12) United States Patent
Zimmer

(10) Patent No.: US 8,861,885 B2
(45) Date of Patent: Oct. 14, 2014

(54) DIRECTIONAL NOISE FILTERING

(75) Inventor: Mark Zimmer, Aptos, CA (US)

(73) Assignee: Apple Inc., Cupertino, CA (US)

(*) Notice: Subject to any disclaimer, the term of this patent is extended or adjusted under 35 U.S.C. 154(b) by 1432 days.

(21) Appl. No.: 12/547,634

(22) Filed: Aug. 26, 2009

(65) Prior Publication Data

US 2011/0052091 A1    Mar. 3, 2011

(51) Int. Cl.
*G06T 5/20* (2006.01)
*G06T 5/00* (2006.01)

(52) U.S. Cl.
CPC . *G06T 5/20* (2013.01); *G06T 5/002* (2013.01); G06T 2207/20192 (2013.01); G06T 2207/10024 (2013.01)
USPC ........... 382/266; 382/261; 382/264; 382/263; 382/199; 348/607; 348/610

(58) Field of Classification Search
CPC .............. G06T 5/20; G06T 5/002; G06T 5/007–5/009; G06T 2207/10024; G06T 2207/20192
USPC ......... 382/167, 199, 254, 260–266, 270, 274, 382/309; 348/606, 610; 358/447, 461, 463
See application file for complete search history.

(56) References Cited

U.S. PATENT DOCUMENTS

| | | | | |
|---|---|---|---|---|
| 6,360,025 B1* | 3/2002 | Florent | ......................... | 382/261 |
| 6,654,055 B1* | 11/2003 | Park et al. | ..................... | 348/242 |
| 6,928,196 B1* | 8/2005 | Bradley et al. | ................ | 382/300 |
| 7,102,638 B2* | 9/2006 | Raskar et al. | ................. | 345/428 |
| 7,130,481 B2* | 10/2006 | Yu | ................... | 382/261 |
| 7,590,307 B2* | 9/2009 | Wang et al. | .................... | 382/300 |
| 7,636,112 B2* | 12/2009 | Hsu et al. | ....................... | 348/241 |
| 7,664,316 B2* | 2/2010 | Aoki | ............................. | 382/162 |
| 8,207,987 B2* | 6/2012 | Lee et al. | ...................... | 345/619 |
| 8,320,622 B2* | 11/2012 | Smith | .......................... | 382/103 |
| 8,358,867 B1* | 1/2013 | Kass et al. | ....................... | 382/266 |
| 8,639,054 B2* | 1/2014 | Hasegawa | ..................... | 382/266 |
| 2003/0053708 A1* | 3/2003 | Kryukov et al. | .............. | 382/261 |
| 2004/0086201 A1* | 5/2004 | Muresan et al. | ............. | 382/300 |
| 2004/0183925 A1* | 9/2004 | Raskar et al. | ................. | 348/239 |
| 2004/0183940 A1* | 9/2004 | Raskar | ......................... | 348/371 |
| 2005/0157940 A1* | 7/2005 | Hosoda et al. | ................ | 382/266 |
| 2005/0220337 A1* | 10/2005 | Arazaki | ........................ | 382/162 |
| 2005/0220350 A1* | 10/2005 | Morisue | ....................... | 382/199 |
| 2006/0170826 A1* | 8/2006 | Park et al. | ..................... | 348/669 |

(Continued)

OTHER PUBLICATIONS

Dimitri Van de Ville et al. "Noise Reduction by Fuzzy Image Filtering." IEEE Transactions on Fuzzy Systems, vol. 11, No. 4, Aug. 2003.

(Continued)

*Primary Examiner* — Jason M Repko
*Assistant Examiner* — Mia M Thomas
(74) *Attorney, Agent, or Firm* — Wong, Cabello, Lutsch, Rutherford & Brucculeri, LLP

(57) ABSTRACT

Techniques in accordance with the following disclosure enable digital images to be filtered (smoothed) to reduce noise and, at the same time, preserve the image's underlying structure. In general, image pixels are analyzed to identify those that participate in, or belong to, structure within the image and those that do not. For those pixels determined to be part of the image's structure, the direction of that structure is determined and filtering or smoothing along that direction is provided. Contrast enhancement in a direction perpendicular to the detected edge's direction may also be provided.

33 Claims, 20 Drawing Sheets

(56) References Cited

U.S. PATENT DOCUMENTS

| | | | |
|---|---|---|---|
| 2007/0103570 A1* | 5/2007 | Inada et al. | 348/252 |
| 2007/0296871 A1* | 12/2007 | Yoo et al. | 348/701 |
| 2008/0025565 A1* | 1/2008 | Zhang et al. | 382/103 |
| 2008/0094491 A1* | 4/2008 | Hsu et al. | 348/246 |
| 2008/0095431 A1* | 4/2008 | Ishiga | 382/167 |
| 2008/0112639 A1* | 5/2008 | Min et al. | 382/264 |
| 2009/0052775 A1* | 2/2009 | Moon et al. | 382/167 |
| 2009/0285480 A1* | 11/2009 | Bennett et al. | 382/167 |
| 2010/0189374 A1* | 7/2010 | Tsukioka | 382/266 |
| 2010/0202701 A1* | 8/2010 | Basri et al. | 382/199 |

OTHER PUBLICATIONS

Chung-Chia Kang et al. "Fuzzy Reasoning-based Directional Median Filter Design." Signal Processing 89 (3): 344-351, Mar. 2009.

* cited by examiner

| A | B | C | D | E |
|---|---|---|---|---|
| F | G | H | I | J |
| K | L | P | M | N |
| Q | R | S | T | U |
| V | W | X | Y | Z |

PIXEL P'S NEIGHBORHOOD

0° SMALL EDGE TEST
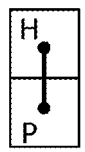
$$VS(H:P) = (H-P)^2$$
FIG. 9A
45° SMALL EDGE TEST
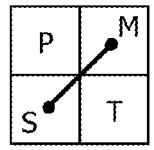
$$VS(M:S) = (M-S)^2$$
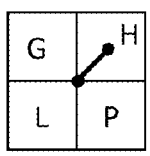
$$VS(H:CENTER) = \left(H - \frac{(G+P)}{2}\right)^2$$
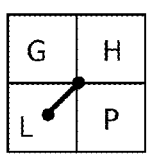
$$VS(CENTER:L) = \left(L - \frac{(G+P)}{2}\right)^2$$
FIG. 9B

90° SMALL EDGE TEST
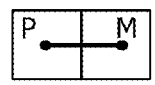   $VS(P:M) = (P - M)^2$
FIG. 9C
135° SMALL EDGE TEST
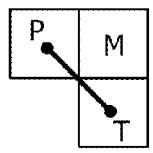   $VS(P:T) = (P - T)^2$
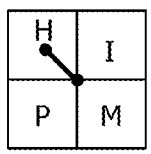   $VS(H:CENTER) = \left(H - \dfrac{(P + I)}{2}\right)^2$
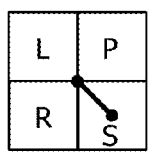   $VS(CENTER:S) = \left(S - \dfrac{(P + R)}{2}\right)^2$
FIG. 9D

| a | a | b | c | c |
|---|---|---|---|---|
| a | a | b | c | c |
| a | a | b | c | c |
| a | a | b | c | c |
| a | a | b | c | c |

0° LARGE EDGE TEST VALUE PATTERN

FIG. 10A

| b | a | a | a | a |
|---|---|---|---|---|
| c | b | a | a | a |
| c | c | b | a | a |
| c | c | c | b | a |
| c | c | c | c | b |

45° LARGE EDGE TEST VALUE PATTERN

FIG. 10B

| a | a | a | a | a |
|---|---|---|---|---|
| a | a | a | a | a |
| b | b | b | b | b |
| c | c | c | c | c |
| c | c | c | c | c |

90° LARGE EDGE TEST VALUE PATTERN

FIG. 10C

| a | a | a | a | b |
|---|---|---|---|---|
| a | a | a | b | c |
| a | a | b | c | c |
| a | b | c | c | c |
| b | c | c | c | c |

135° LARGE EDGE TEST VALUE PATTERN

FIG. 10D

0° SMALL EDGE DIRECTIONS TEST $$VS(H:I) = (H-I)^2$$

18° SMALL EDGE DIRECTIONS TEST $$VS(P:M) = \left(P - \frac{(2M+T)}{3}\right)^2$$

$$VS(S:T) = \left(T - \frac{(2S+P)}{3}\right)^2$$

0° LARGE EDGE DIRECTIONS TEST
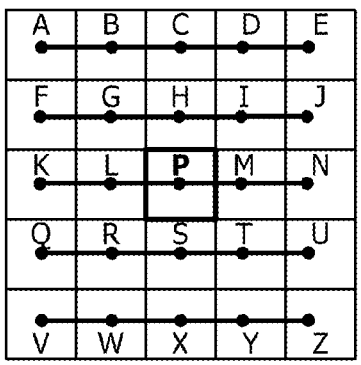
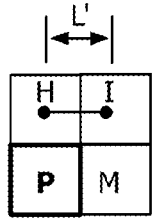
$$VL(H:I) = (H - I)^2$$
FIG. 13A
18° LARGE EDGE DIRECTIONS TEST
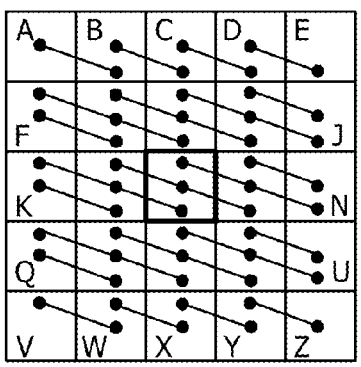
$$VL(H:I) = \left(H - \frac{(2I + M)}{3}\right)^2$$
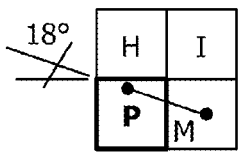
$$VL(P:M) = \left(M - \frac{(2P + H)}{3}\right)^2$$
FIG. 13B

27° LARGE EDGE DIRECTIONS TEST
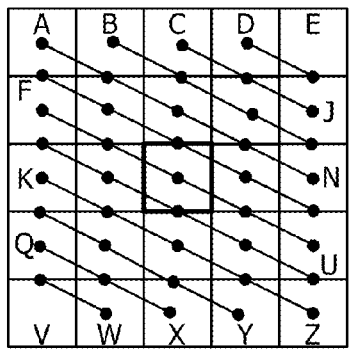
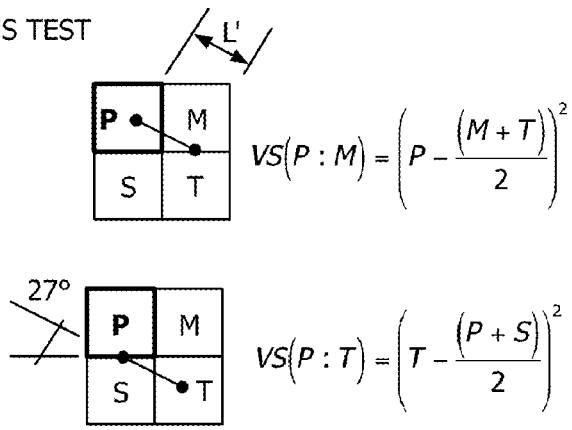
$$VS(P:M) = \left(P - \frac{(M+T)}{2}\right)^2$$
$$VS(P:T) = \left(T - \frac{(P+S)}{2}\right)^2$$
FIG. 13C
45° LARGE EDGE DIRECTIONS TEST
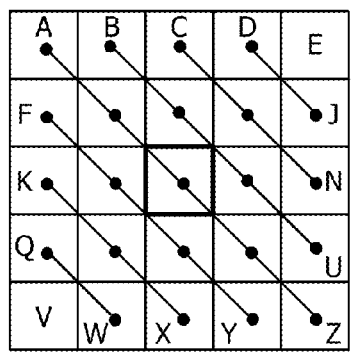
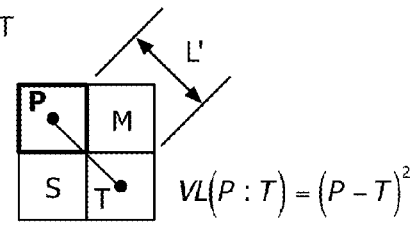
$$VL(P:T) = (P - T)^2$$
FIG. 13D

0° CORNER TEST DATA COLLECTION

C1(0° DEGREES) = K + L

C2(0° DEGREES) = M + N

FIG. 14A

45° CORNER TEST DATA COLLECTION

C1(45° DEGREES) = R + V

C2(45° DEGREES) = E + I

FIG. 14B

90° CORNER TEST DATA COLLECTION

C1(90° DEGREES) = S + X

C2(90° DEGREES) = C + H

FIG. 14C

135° CORNER TEST DATA COLLECTION

C1(135° DEGREES) = T + Z

C2(135° DEGREES) = A + G

FIG. 14D

SMALL PIXEL P AT 0 DEGREES

M1(P AT 0) = (L+2P+M)/4

M2(P AT 0) = (H+2P+S)/4

LARGE PIXEL P AT 0 DEGREES

SMALL PIXEL P AT 18 DEGREES

M1(P AT 18) = (G+2L+6P+2M+T)/12

M2(P AT 18) = (R+2S+6P+2H+I)/12

LARGE PIXEL P AT 18 DEGREES

SMALL PIXEL P AT 27 DEGREES

M1(P AT 27) = (G+L+4P+M+T)/8

M2(P AT 27) = (H+I+4P+R+S)/8

LARGE PIXEL P AT 27 DEGREES

SMALL PIXEL P AT 45 DEGREES

M1(P AT 45) = (G+2P+T)/4

M2(P AT 45) = (R+2P+I)/4

LARGE PIXEL P AT 45 DEGREES

SMALL PIXEL P AT 63 DEGREES

M1(P AT 63) = (G+H+4P+T+S)/8

M2(P AT 63) = (R+L+4P+I+M)/8

LARGE PIXEL P AT 63 DEGREES

SMALL PIXEL P AT 72 DEGREES

M1(P AT 72) = (G+2H+6P+2S+T)/12

M2(P AT 72) = (R+2L+6P+2M+I)/12

LARGE PIXEL P AT 72 DEGREES

DIRECTIONAL NOISE FILTERING

BACKGROUND

The invention relates generally to digital image processing and more particularly to directional noise filtering processes that reduces noise in the original image while also improving contrast.

Digital image processing involves the use of special purpose hardware and computer implemented algorithms (i.e., computer programs) to transform digital images. Digital still/video cameras, whether unitary or embedded in consumer products such as mobile telephones, generate data files whose contents represent the scene whose image was captured. Because of scene lighting, device imperfections and/or human proclivities, the captured data may not be an accurate (or desired) representation of the captured scene.

The difference between what an individual wants or likes to see in an image, and the data actually captured may be thought of as "noise." The reduction of noise is the subject of this disclosure.

SUMMARY

In one embodiment the invention provides a method to selectively filter an image. The method includes obtaining an input image made up of pixels (each having a value); identifying a direction of a structure at one or more of the pixels; and transforming the input image into an output image by filtering the input image along the identified direction of the structure at each of the one or more pixels.

In another embodiment, the invention comprises a computer executable program to implement the method, where the program may be tangibly recorded in any media that is readable and executable by a computer system or programmable control device. In yet another embodiment, the invention comprises a computer system for performing the described methods. In still another embodiment, the invention comprises a system having one or more computer systems communicatively coupled wherein at least one of the computer systems is designed or programmed to perform the described methods.

BRIEF DESCRIPTION OF THE DRAWINGS

FIGS. 9A-9D illustrate the components of a small edge test variance calculation in accordance with one embodiment of the invention.

FIGS. 10A-10D illustrate the components of a large edge test variance calculation in accordance with one embodiment of the invention.

FIGS. 13A-13D illustrate large directional structure tests in accordance with one embodiment of the invention.

FIGS. 14A-14D illustrate the components of a corner test variance calculation in accordance with one embodiment of the invention.

FIGS. 19A-19F show directional mean calculations in accordance with one embodiment of the invention.

DETAILED DESCRIPTION

The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any actual implementation, numerous programming and component decisions must be made to achieve the developers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the image processing field having the benefit of this disclosure. Accordingly, the claims appended hereto are not intended to be limited by the disclosed embodiments, but are to be accorded their widest scope consistent with the principles and features disclosed herein.

Figure 1:
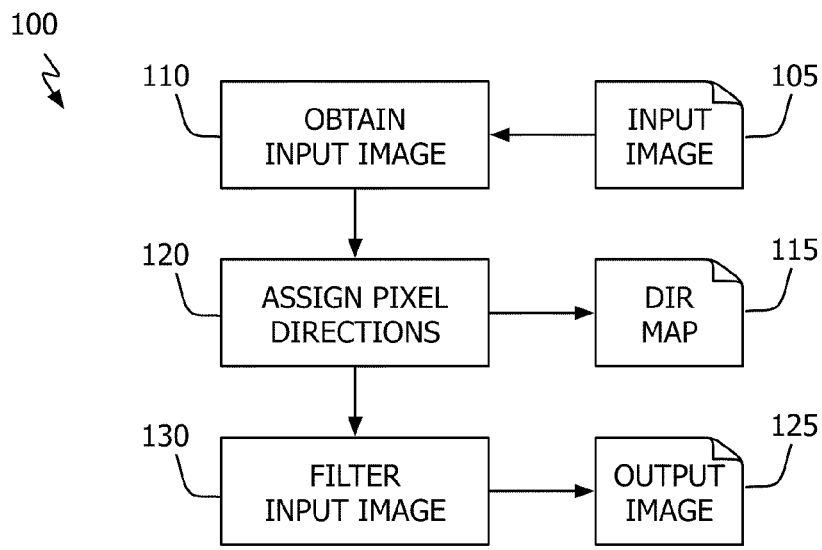
FIG. 1 shows, in flowchart form, the basic operations of an image processing technique in accordance with this disclosure.

Directional noise filtering operations in accordance with general principles of the invention may be described as illustrated in FIG. 1. Operation 100 begins by obtaining input image 105 (block 110). Next, a direction is assigned to each pixel in the input image to create a corresponding direction map 115 (block 120) and filtering along those corresponding directions is applied (block 130) to generate output image 125. In accordance with operation 100, output image 125 has reduced noise and enhanced edge contrast compared to input image 105.

As used herein, the term "image" means a digital representation of a scene recorded in a digital storage media. Specifically, an image constitutes a physical entity in that the contents, format, or representation of the image in the storage media has a specific pattern. In this manner, an image is similar to a program used to cause a programmable control device to perform a task—when executed (viewed) memory within the programmable control device take on a unique and specific pattern.

Figure 2:
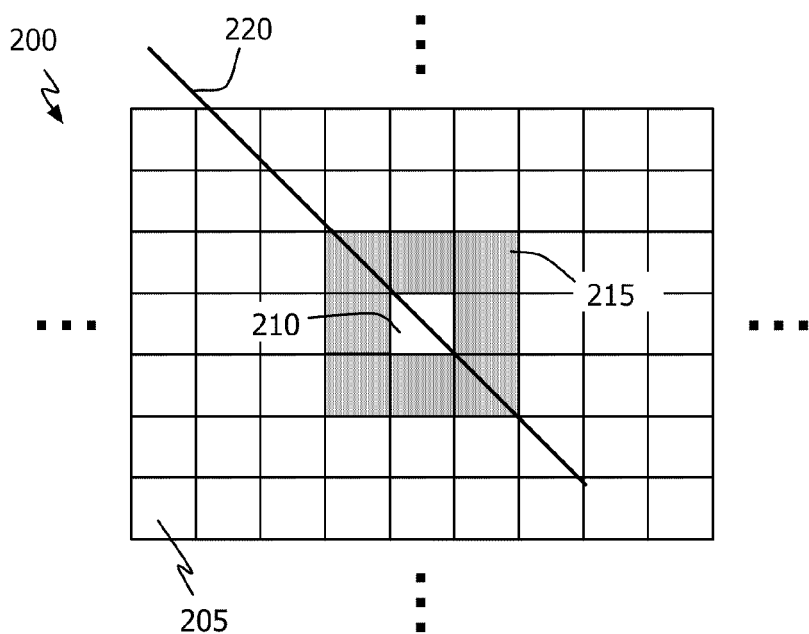
FIG. 2 illustrates a portion of a pixel array in which an image structure is shown passing through a pixel at approximately 45°.

As used herein, the "direction" of pixel p refers to the direction of structure within the image centered about pixel p. Referring to FIG. 2, for example, array 200 comprises an array of pixels (e.g., pixel 205). The direction of pixel 210 may be determined by the values of its neighboring pixels it (e.g., shaded pixels 215) and reflects the direction of the structure within the image at the pixel. By way of example, structure 220 represents an edge through the image (captured by pixel array 200) that runs approximately 45° through pixel 210. Accordingly, pixel 210 would have a directional value of 45° assigned to it. In addition to specified directions (e.g., 18°, 27°, 45° and 90°), pixels may be assigned a directional value of no_direction. This may occur, for example, if the noise in the area surrounding the pixel under examination dominates whatever structure is in the image at that pixel. Pixels may also be assigned a directional value of "corner." This may occur when the curvature of a detected structure exceeds some maximum value at the pixel and attempts to smooth it would round the corner off. (It should be noted, a pixel's neighborhood is not restricted to a 3×3 array as illustrated in FIG. 2. See discussion below.)

Figure 3:
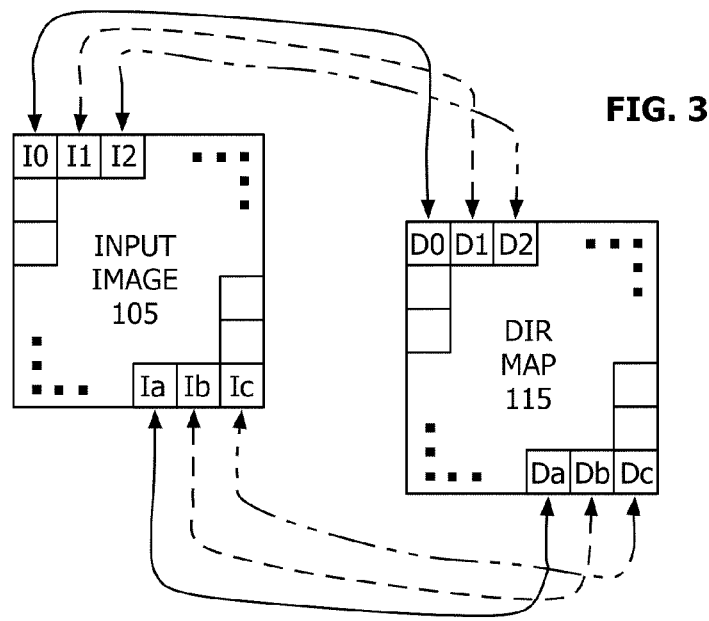
FIG. 3 illustrates the one-to-one correspondence between image pixels and direction map elements in one embodiment of the invention.

Elements in direction map 115 generally have a one-to-one correspondence to pixels in image 105. Referring to FIG. 3, for example, element D0 in direction map 115 corresponds to pixel I0 in image 105 just as element Dc in direction map 115 corresponds to pixel Ic in image 105.

Acts in accordance with block 130 utilize direction map 115 to selectively smooth/filter input image 105. For example, image pixels corresponding to direction map elements assigned a direction of no_direction may be filtered in a first way, image pixels corresponding to direction map elements determined to be part of a corner may be filtered in a second way and image pixels corresponding to direction map elements assigned a direction other than no_direction (e.g., 45°) may be filtered in a third way. In one embodiment, image pixels corresponding to no_direction direction map elements may be blurred with, for example, a Gaussian blur; image pixels corresponding to direction map elements identified as corners may be left unperturbed and image pixels corresponding to direction map elements assigned a specific direction (e.g., 45°) may be filtered along their assigned direction. In another embodiment, direction map 115 may be pre-filtered to eliminate spurious directional regions (e.g., small isolated collections of direction map elements surrounded by other elements having no direction) while allowing the more highly-connected directional areas (e.g., collections of direction map elements reflecting real structure in the input image) to remain intact for subsequent smoothing operations.

Figure 4:
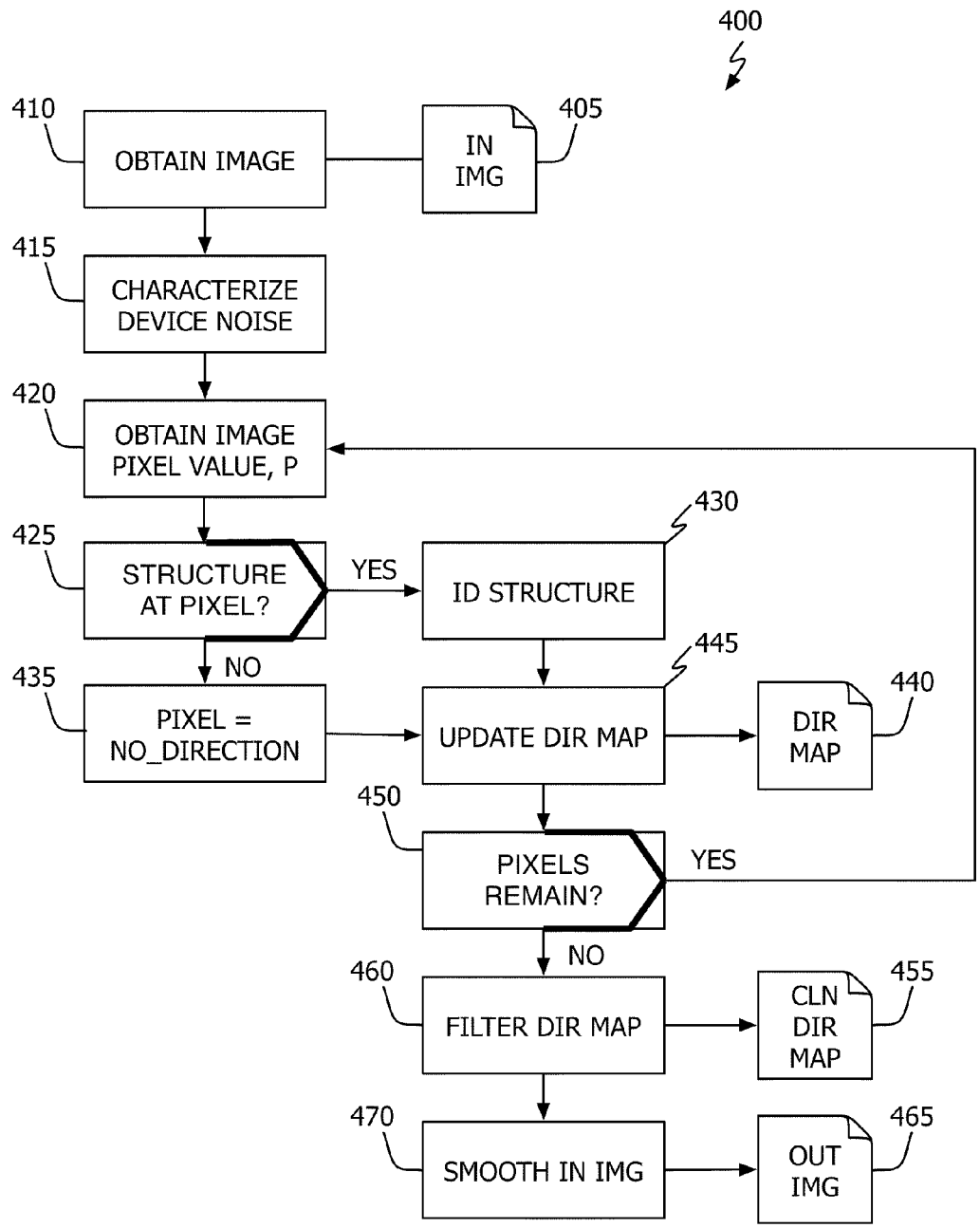
FIG. 4 shows, in flowchart form, an image filtering operation in accordance with one embodiment of the invention.

For a more detailed overview of image processing operations in accordance with this disclosure, see FIG. 4. In this illustrative example, image processing operation 400 begins when input image 405 is obtained (block 410). Next, the noise associated with the device generating image 405 is characterized (block 415). Pixel by pixel processing of input image 405 begins by selecting a first pixel (block 420). Based on the image capture device's characteristics collected during the acts of block 415, an initial test is made to determine if any structure may be attributed to the selected pixel (block 425).

In one embodiment, for example, structure is sought along a limited number of directions (about the selected pixel) for the purpose of determining if the pixel is part of a structure within image 405. If it is determined that structure exists at the selected pixel (the "YES" prong of block 425), the specific direction of the structure is determined next (block 430). If it is determined that structure does not exist at the selected pixel (the "NO" prong of block 425), the selected pixel is identified as a no-direction pixel (block 435). After the acts of either block 430 or 435, direction map 440 is updated to identify the selected pixel's angle or to identify the pixel as having no direction (block 445). Following the acts of block 445, a check is made to determine if all pixels in image 405 have been processed (block 450). If pixels remain to be processed (the "YES" prong of block 450), operation 400 returns to the acts of block 420 wherein another pixel is selected. If all pixels in image 405 have been processed in accordance with blocks 420-445 (the "NO" prong of block 450), direction map 440 may be filtered (to remove areas of spurious indicated structure) to generate clean direction map 455 (block 460). Input image 405 and clean direction map 455 may then be used to generate output image 465 (block 470). As will be discussed in more detail below, acts in accordance with block 470 can significantly reduce image noise while, at the same time, providing edge contrast enhancement. With the general outline of an image processing operation provided above, each of the individual operations introduced in FIG. 4 will now be discussed in more detail.

With respect to the acts of block 410, input image 405 may be obtained in many formats. In one embodiment for example, input image 405 comprises a YCbCr representation (having a gamma value of approximately 1.0). In another embodiment, input image 405 comprises a Y'Cb'Cr' representation (having a gamma value of approximately 2.0). In yet another embodiment, input image 405 comprises an RGB representation. In those implementations in which image 405 comprises a YCbCr representation, only the Y (luminance) need be processed in accordance with the techniques described herein. In those implementations where image 405 comprises an RGB representation, each channel (R, G and B) may be individually processed in accordance with the techniques described herein. In still another embodiment, less than all channels in an RGB representation may be processed in accordance with the techniques described herein.

With respect to the acts of block 415, an image capture device's noise characteristics may generally be determined from one or more items of image metadata. In general, image capture devices embed certain metadata within each captured image (e.g., image 405). From this information, and knowledge of the device itself, it is generally possible to characterize the overall noise environment of the device. By way of example, the noise characteristics of a particular device (e.g., a digital camera embedded in a consumer device such as a mobile telephone or media player device) at a particular pixel may be a function of ISO (aka gain) and exposure time and may be represented as:

$$\text{Noise}(p) = f(\text{ISO}, \text{Exposure\_Time}, \text{Pixel\_Value}) \qquad \text{EQ. 1}$$

where Noise(p) represents the noise variance at a given pixel p whose value is given by Pixel_Value.

It will be recognized that while different image capture devices may characterize their noise in different ways (i.e., linear versus non-linear and/or with different metadata items), the form EQ. 1 takes is generally known for each device. For example, assuming a linear noise relationship for function f( ) in EQ. 1, the noise at a selected pixel p may be described as follows:

$$\text{Noise}(p) = [(\text{Shot\_Noise}) \times h(p)] + (\text{Dark\_Noise}) \qquad \text{EQ. 2}$$

where shot noise and dark noise are functions of image metadata (e.g., ISO and exposure time) and h(p) represents a value that is a function of pixel p's value. Determination of shot noise and dark noise are generally a function of the image capture device and are assumed known once image metadata is obtained.

Figure 5:
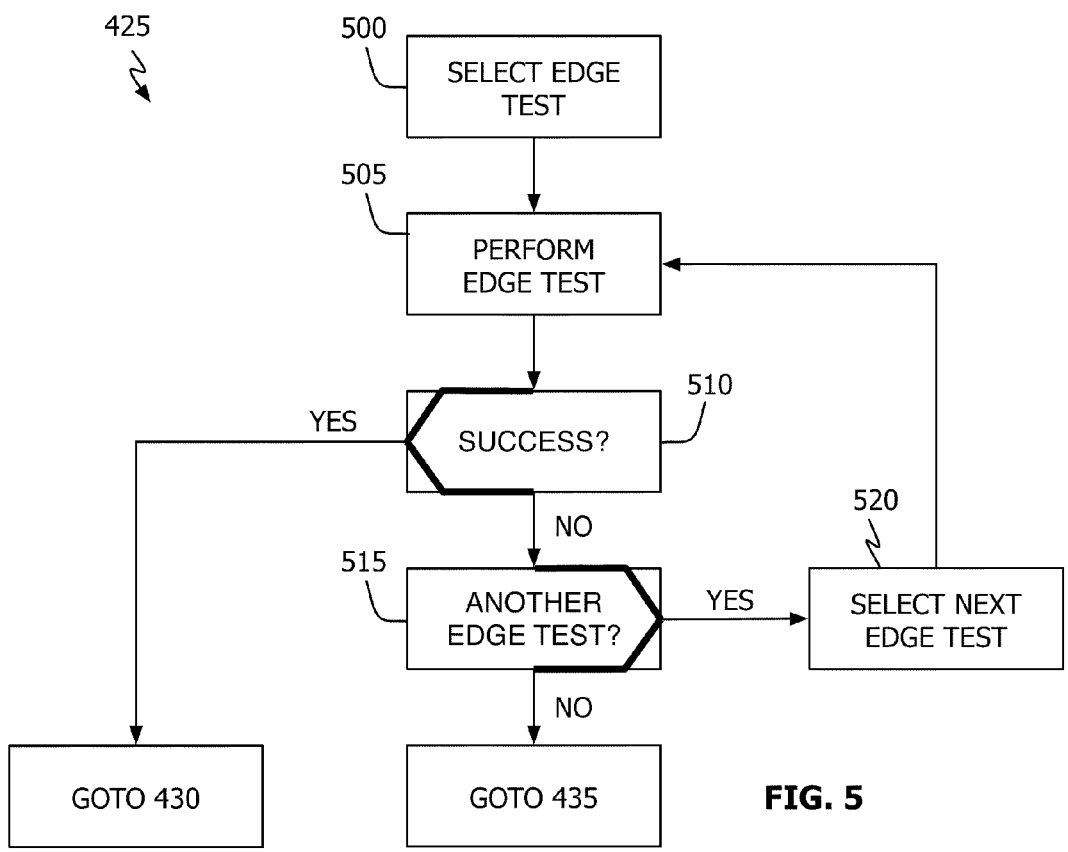
FIG. 5 shows, in flowchart form, a structure detection process in accordance with one embodiment of the invention.

With respect to the acts of block 425, FIG. 5 outlines one approach to determine whether a selected pixel can be associated with structure within image 405. As shown, a first edge test is selected (block 500) and that test is performed (block 505). If an edge is detected at the selected pixel (the "YES" prong of block 510) operations continue at block 430. If no edge is detected under the current edge test (the "NO" prong of block 510), a check is made to determine if there is another edge test that may be performed (block 515). If another edge test is to be performed (the "YES" prong of block 515), that test is selected (block 520) whereafter operations resume at block 505. If no additional edge tests need be performed (the "NO" prong of block 515), operations resume at block 435.

In one embodiment, each edge test (block 505) uses a different number of pixels to disambiguate noise from structure. For example, a first test could use a 3×3 pixel neighborhood (i.e., a first resolution) while a second test could use a 5×5 pixel neighborhood (i.e., a second resolution). Only after a sufficient number of pixels have been used is it generally possible to distinguish structure from no structure in light of the noise present at the selected pixel in input image 405. (See additional discussion below.) Thus, if a first edge test using a first number of pixels is not sufficiently robust to distinguish structure (or the lack thereof) from noise, a second test using a second first number of pixels may be used. Successive tests using different numbers of pixels may also be used—that is, more than two edge tests may be used.

Figures 6, 8:
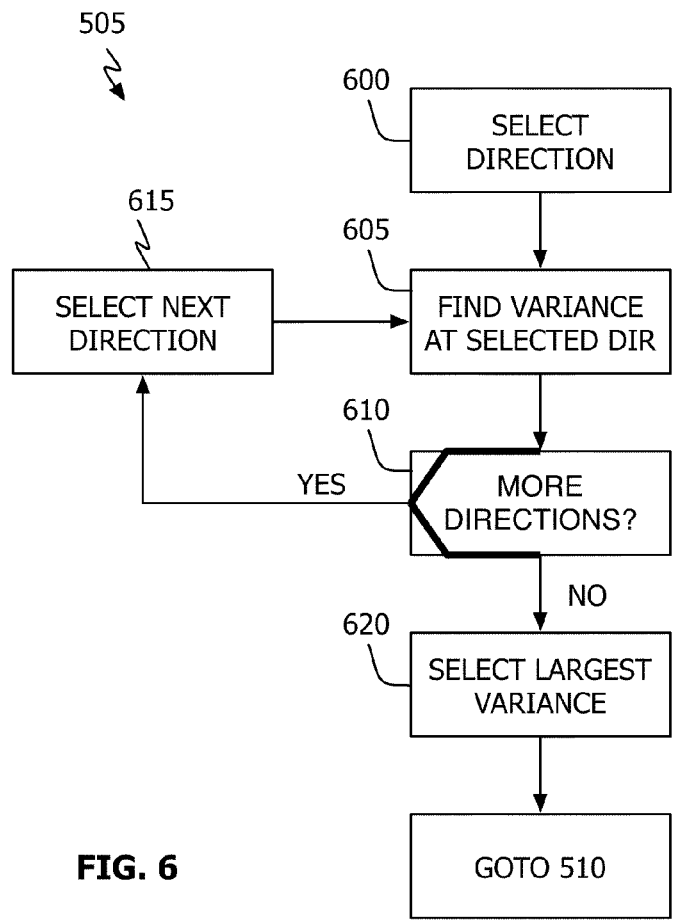
FIG. 6 shows, in flowchart form, a directional structure test method in accordance with one embodiment of the invention.
FIG. 8 illustrates a 5×5 pixel neighborhood centered about pixel p.

With respect to acts in accordance with block 505, FIG. 6 outlines an approach for determining whether a selected pixel participates in, or is part of, an edge structure in image 405. An initial direction is chosen (block 600) and the selected pixel's variance at that direction is determined (block 605). If additional directions are to be evaluated for the currently selected edge test (the "YES" prong of block 610), a next direction is chosen (block 615) whereafter operations continue at block 605. If the currently selected edge test has no additional directions to evaluate (the "NO" prong of block 610), the largest variance selected from among all of the variances determined for the current test is chosen (block 620) whereafter operations continue at block 510.

With respect to the acts of block 510, in one embodiment a pixel is said to participate in, or be part of, a structure within image 405 if the largest variance calculated for a given edge test (e.g., the result of acts in accordance with block 620) is greater than or equal to the selected pixel's edge noise threshold, where the selected pixel's edge noise threshold is based on the pixel's noise characterization as given in EQ. 2.

Figure 7:
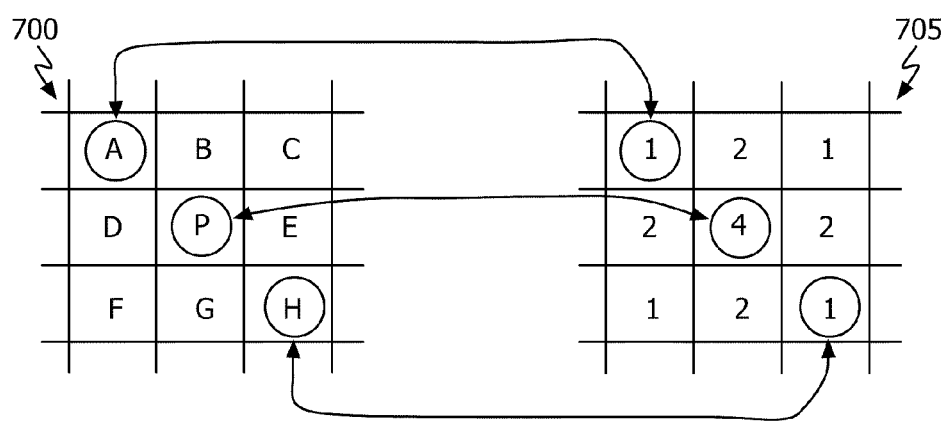
FIG. 7 illustrates how an image pixel's average tonal value may be determined in accordance with one embodiment of the invention.

Referring to EQ. 2, in one embodiment a pixel's h(p) function represents the average tonal value of pixel p. A pixel's average tonal value may be determined by taking the weighted average of a number of pixel values surrounding the pixel. Referring to FIG. 7, in one illustrative embodiment 3×3 neighborhood 700 and weighting factors 705 may be used to compute pixel p's average tonal value. The arrows in FIG. 7 indicate that weighting values 705 are applied in a one-to-one correspondence to pixel values 700. For completeness: A→1, B→2, C→1, D→2, P→4, E→2, F→1, G→2 and H→1. With this background, and for this embodiment, the average tonal value of pixel p may be written as:

$$h(p) = ATV(p) = \frac{A + 2B + C + 2D + 4p + 2E + F + 2G + H}{16} \quad \text{EQ. 3}$$

It will be recognized that the sum of products in the numerator of EQ. 3 is divided by 16 (the sum of the weight values) to generate an "average" value.

In the embodiment represented by EQ. 3 and shown in FIG. 7, weighting factors 705 implement a digital approximation to a small Gaussian blur applied to pixel p. One of ordinary skill in the art will recognize that other neighborhood sizes and other aggregation techniques may be used. For example: 1×1, 5×5 or 9×9 neighborhoods may be used as well as non-square neighborhoods; different weighting factors may be applied (e.g., unity); and combining strategies other than Gaussian may be employed.

Substituting the selected pixel's average tonal value for pixel noise function h(p) in EQ. 2 yields:

Noise(p)=((Shot_Noise)×ATV(p))+(Dark_Noise)     EQ. 4

Substituting the illustrative average tonal value given by EQ. 3 into EQ. 4 yields a characterization of noise for the selected pixel and the given image capture device:

$$\text{Noise}(p) = \quad \text{EQ. 5}$$
$$(\text{Dark\_Noise}) + \left( \frac{(\text{Shot\_Noise}) \times}{A + 2B + C + 2D + 4p + 2E + F + 2G + H} \right)$$
$$\frac{}{16}$$

With the noise characterized at pixel p (EQ. 5), a noise threshold for pixel p may be specified. Separate noise thresholds may be used for the small edge test, the large edge test, and the corner test. In one embodiment, pixel p's noise threshold is given by:

Noise Threshold(p)=Noise(p)×T×NF(p)     EQ. 6 where T represents the number of squared terms in the variance calculation discussed below vis-à-vis EQS. 7b, 8b, 9b, 10b and 14-17. The factor NF(p) represents an a priori empirically determined noise factor, selected to reliably determine when a pixel's value is attributable to structure within the underlying image. One of ordinary skill in the art will recognize that the value of NF(p) may vary from image capture device to image capture device, from pixel to pixel and may be time-consuming to determine but is, nevertheless, straightforward to find given this disclosure.

In applications in which input image 405 is in Y'Cb'Cr' format, image gamma is often approximately 2. In these cases, noise variance across an image has been found to be relatively constant. Accordingly, in these implementations it may be possible to calculate a single noise threshold in accordance with EQ. 6 once per image rather than for each pixel as described above.

Referring again to FIG. 4 at block 425, FIG. 5 at block 505 and FIG. 6, an illustrative embodiment for determining whether pixel p participates in, or belongs to, a structure within image 405 will now be described. In the following, four directions (0°, 45°, 90° and 135°) are tested for each of two edge tests—a "small" edge test and a "large" edge test.

The described small edge test uses a smaller neighborhood than does the large edge test. As a result, the larger edge test is less sensitive to noise. Conceptually, a small edge test may be performed first as it is less computationally costly than a large edge test. If the structure is "significant" enough to be detected by the small edge test, processing continues. If the structure is not detected by the small edge test, a large edge test may be performed (as it is in the illustrative embodiment described herein) to improve the chances that a structure is detected.

In the following, each edge test assumes the pixel being evaluated (pixel p) is at the center pixel in a 5×5 array of pixels. FIG. 8 illustrates a 5×5 neighborhood and identifies each pixel (A→N and P→Z), the selected pixel being pixel p (the center pixel).

Beginning with a small edge test, the variance for pixel p across an edge aligned to the 0° direction may be visualized as the sum of the squares of differences along the 90° (perpendicular) direction, centered about pixel p. In FIG. 9A, pixel values are illustrated as dots (③) whose values are represented by the associated alpha-character. The "distance" between two pixel values is represented by the length of the line connecting two dots. Also shown in FIG. 9A is an example calculation for the variance between pixels P and H. The same equation may be applied to each of the other 5 identified vectors so that the total small edge test variance for pixel p at 0° is given by EQ. 7.

$$VS(p \text{ at } 0°) = \\ V(L{:}G) + V(P{:}H) + V(M{:}I) + V(L{:}R) + V(P{:}S) + V(M{:}T) \quad \text{EQ. 7a}$$

$$VS(p \text{ at } 0°) = (L-G)^2 + (P-H)^2 + \\ (M-I)^2 + (L-R)^2 + (P-S)^2 + (M-T)^2 \quad \text{EQ. 7B}$$

where V(x) represents the variance of x.

In similar fashion, FIGS. 9B-9D show the inter-pixel metrics used to calculate pixel p's variance across edges aligned at 45°, 90° and 135° respectively. Included in each of FIGS. 9B-9D are example calculations for each unique inter-pixel "distance." Equations 8-10 show the total small edge test variance for pixel p at 45°, 90° and FIG 135° respectively.

$$VS(p \text{ at } 45°) = V(I{:}P) + V(P{:}R) + V(H{:}\text{ CENTER}) + \\ V(\text{CENTER}{:}\ L) + V(M{:}\text{ CENTER}) + V(\text{CENTER}{:}\ S) + \quad \text{EQ. 8a}$$

$$VS(p \text{ at } 45°) = (I-P)^2 + (P-R)^2 + \left[H - \frac{(G+P)}{2}\right]^2 + \\ \left[L - \frac{(G+P)}{2}\right]^2 + \left[M - \frac{(P+T)}{2}\right]^2 + \left[S - \frac{(P+T)}{2}\right]^2 \quad \text{EQ. 8b}$$

$$VS(p \text{ at } 90°) = \\ V(G{:}H) + V(H{:}I) + V(L{:}P) + V(P{:}M) + V(R{:}S) + V(S{:}T) \quad \text{EQ. 9a}$$

$$VS(p \text{ at } 90°) = (G-H)^2 + (H-I)^2 + \\ (L-P)^2 + (P-M)^2 + (R-S)^2 + (S-T)^2 \quad \text{EQ. 9b}$$

$$VS(p \text{ at } 135°) = V(G{:}P) + V(P{:}T) + V(H{:}\text{ CENTER}) + \\ V(\text{CENTER}{:}\ M) + V(L{:}\text{ CENTER}) + V(\text{CENTER}{:}\ S) \quad \text{EQ. 10a}$$

$$VS(p \text{ at } 135°) = (G-P)^2 + (P-T)^2 + \left[H - \frac{(P+I)}{2}\right]^2 + \\ \left[M - \frac{(I+P)}{2}\right]^2 + \left[L - \frac{(P+R)}{2}\right]^2 + \left[S - \frac{(P+R)}{2}\right]^2 \quad \text{EQ. 10B}$$

where the notation "CENTER" refers to a pixel "location" that is at the junction of two or more other pixels. See, for example, FIG. 9B's illustrative calculation and corresponding diagram for VS(H:CENTER).

Referring once more to FIG. 6, after the total variance for the selected pixel has been determined for each of the four directions (see EQS. 7-10), the largest of the four variances is selected. Operations in accordance with the current illustrative embodiment then continues at block 510 wherein the largest variance is compared against the selected pixel's noise threshold (see EQ. 6). If the calculated variance is larger than the pixel's small edge noise threshold (the "YES" prong of block 510), information pertaining to determining whether the selected pixel is part of a corner structure is gathered whereafter operations continue at block 430 where additional detail about the structure within which the selected pixel participates is collected. If the test of block 510 fails, another edge test is selected if available in accordance with block 515. As noted above, in the current illustrative embodiment a second edge test is a large edge test which, accordingly, uses a large edge threshold for its comparisons.

In accordance with one embodiment of a large edge test, the selected pixel p's neighborhood is divided into 3 regions (labeled "a," "b" and "c" in FIGS. 10A-10D). Pixel values within each region are summed and an average for each sum is calculated as follows:

$$a = \sum (\text{all pixels labeled } "a") \quad \text{EQ. 11a}$$
and
$$a(\text{average}) = \frac{a}{10} \quad \text{EQ. 11b}$$

$$b = \sum (\text{all pixels labeled } "b") \quad \text{EQ. 12a}$$
and
$$b(\text{average}) = \frac{b}{5} \quad \text{EQ. 12b}$$

$$c = \sum (\text{all pixels labeled } "c") \quad \text{EQ. 13a}$$
and
$$c(\text{average}) = \frac{c}{10} \quad \text{EQ. 13b}$$

With average values known for each region in accordance with EQS. 11b, 12b and 13b, the large edge variance values for each of the inspected directions is given by:

$$VL(p \text{ at } 0°) = (a(\text{average at } 0°) - b(\text{average at } 0°))^2 + \\ (b(\text{average at } 0°) - c(\text{average at } 0°))^2 \quad \text{EQ. 14}$$

$$VL(p \text{ at } 45°) = (a(\text{average at } 45°) - b(\text{average at } 45°))^2 + \\ (b(\text{average at } 45°) - c(\text{average at } 45°))^2 \quad \text{EQ. 15}$$

$$VL(p \text{ at } 90°) = (a(\text{average at } 90°) - b(\text{average at } 90°))^2 + \\ (b(\text{average at } 90°) - c(\text{average at } 90°))^2 \quad \text{EQ. 16}$$

and $$VL(p \text{ at } 135°) = (a(\text{average at } 135°) - b(\text{average at } 135°))^2 + \\ (b(\text{average at } 135°) - c(\text{average at } 135°))^2 \quad \text{EQ. 17}$$

As in the small edge test, the largest of the variances calculated in accordance with EQS. 14-17 is selected and compared against the selected pixel's large edge noise threshold. If the value is greater than the pixel's large edge noise threshold (the "YES" prong of block 510), information pertaining to determining whether the selected pixel is part of a corner structure is gathered whereafter operations continue at block 430 where additional detail about the structure within which the selected pixel participates is collected. If the test of block 510 fails, another edge test is selected if available in accordance with block 515. Since, in the current example, no additional edge tests are specified operations continue at block 435.

In EQS. 11b, 12b and 13b the average region value was calculated. It has been found beneficial, without significant impact on the described process, to calculate a(average), b(average) and c(average) values using denominator values that are even powers of two. Accordingly, EQS. 11b and 13b may also be calculated as follows:

$$a(\text{average}) = \frac{a}{16} \quad \text{EQ. 18}$$

$$b(\text{average}) = \frac{b}{8} \text{ and} \quad \text{EQ. 19}$$

$$c(\text{average}) = \frac{c}{16} \quad \text{EQ. 20}$$

A corresponding adjustment to the large edge test noise factor must be made: it should be multiplied by $(5/8)^2$ squared which is $25/64$.

It will be recognized, both the small and large edge tests described above are arranged to accomplish "middle difference" summing. Thus, a more positive indication of structure is obtained by computing the sum of multiple differences from a middle ground where the edge presumably lies. It will further be recognized that other edge tests may sum differences across the center without using the value at the center. These types of edge tests (e.g., the Sobel gradient test) tend to miss thin lines for this reason.

As noted above, when an edge test is successful additional data is gathered to assist in determining whether the selected pixel is part of a corner structure. (As used here, the term "successful" means the calculated variance for the selected pixel is greater than the pixel's edge noise threshold.) While a different arrangement of pixels is collected depending upon which direction had the largest variance, determining whether a given pixel is part of a corner structure in image 405 is the same regardless of which edge test is being used (e.g., small or large). Referring to FIGS. 14A-14D, two values are obtained for each direction: C1 and C2. C1 and C2 values may then be used to calculate a "corner variance" value as follows:

$$T1 = \frac{C1}{2} - P \quad \text{EQ. 21a}$$

$$T2 = \frac{C2}{2} - P \quad \text{EQ. 21b}$$

$$V(\text{corner}) = T1^2 + T2^2 \quad \text{EQ. 21c}$$

where V(corner) represents the calculated variance for the selected pixel assuming it is part of a corner structure.

The above corner accommodation technique may be utilized to minimize the rounding-off of corners during a subsequent smoothing operation—see block 470. For example, the lower left corner of a rectangular object will have direction values of 90° on its left side and direction values of 0° on its lower side. At the corner, however, the direction value is 45°. Accordingly, looking along the 45° direction of any corner having sufficient curvature yields highly differing pixel values. The above test exploits this result: pixels meeting the above test may be marked as corners and ignored during smoothing.

Referring again to FIG. 4 and with respect to the acts of block 430, if V(corner) is greater than the selected pixel's corner noise threshold, the pixel is considered part of a corner structure in image 405. This information is used to update direction map 440 (block 445). In similar fashion, if acts in accordance with block 425 determine that the selected pixel is not part of, or does not participate in, an edge structure, the selected pixel is identified as a no_direction pixel (block 435) and direction map 440 is updated accordingly (block 445).

As previously noted, noise factor NF(p) (first identified in EQ. 6) may be experimentally determined and is chosen so that the selected pixel's edge noise threshold accurately distinguishes between structure and the lack of structure at the selected pixel. In general, noise factor NF(p) may be chosen so that edges are positively identified. The nature of noise in images, however, causes some random alignment of pixel data in areas of pure noise. These become false positive edge indications. Such areas typically do not line up or connect like real edges. To recognize and eliminate such false positives, direction map 440 may be filtered in accordance with block 460 (see discussion below).

It has been found that one factor in determining a value for NF(p) is the number of terms used to calculate the edge variance (e.g., EQS. 7b, 8b, 9b, 10b, 14-17 and 21c). Thus, for the illustrative small edge test described above (see EQS. 7b, 8b, 9b, 10b), this would be 6. For the illustrative large edge test described above (see 14-17), this would be 2. And for the illustrative edge test described above (see EQ. 21c), this would also be 2.

Referring again to FIG. 4 at block 430, once it has been determined that the selected pixel is part of, or participates in, structure within image 405, the details/direction of that structure are determined. In general, operations in accordance with block 430 may analyze image 405 for structure at any number of directions. In one embodiment, acts in accordance with block 430 test the selected pixel at 4 directions. In other embodiments, 8, 12, 16, 20 or 24 directions are tested. In the illustrative embodiment discussed herein, the selected pixel is analyzed in 12 directions: 0°, 18°, 27°, 45°, 63°, 72°, 90°, 108°, 117°, 135°, 153° and 162°.

Figure 11:
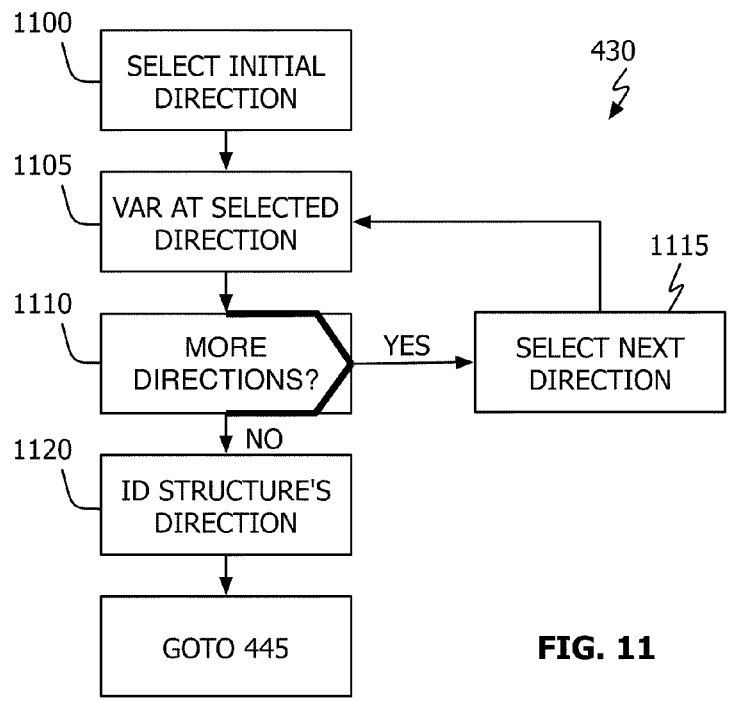
FIG. 11 shows, in flowchart form, a directional structure determination operation in accordance with one embodiment of the invention.

Referring to FIG. 11, structure identification operation 430 begins by selecting an initial direction (block 1100), after which the selected pixel's variance along that direction is determined within a specified neighborhood (block 1105). While the process described herein is not so limited, directional tests for the current example implementation use a 5×5 neighborhood (see FIG. 8). Once the variance for a selected direction has been determined, a check is made to determine if the selected pixel needs to be evaluated at additional directions (block 1110). If additional directions do need evaluation (the "YES" prong of block 1110), a next direction is selected (block 1115), whereafter operations continue at block 1105. Once the selected pixel has been evaluated along all desired directions (the "NO" prong of block 1110), that direction indicating the highest correlation to structure is selected (block 1120) whereafter operations continue at block 445. One may think about the variance determined in accordance with the acts of block 1105 as reflecting the difference between the angle selected in accordance with blocks 1100 or 1115 and the actual edge associated with the selected pixel. That is, the more the actual edge is not aligned with the selected angle, the more variance one should expect. Thus, one means to improve the "accuracy" of a directional edge test in accordance with the invention is to increase the number of directions along which an edge may be detected.

With respect to determining the variance along each specified direction (block 1105), the variance of a pixel may be determined by finding the sum of the squares of the length vectors between adjacent pixels in the selected pixel's neighborhood along the specified direction. This approach may be substantially the same as that used with respect to the acts of block 605. By way of example, FIGS. 12A-12D illustrate one technique to calculate the directional structure variance at 0°, 18°, 27° and 45° when the structure at the selected pixel was identified using the above-described small edge test (block 425). Similarly, FIGS. 13A-13D illustrate a technique to calculate the directional structure variance at 0°, 18°, 27° and 45° when the structure at the selected pixel was identified using the above-described large edge test (block 425). Those skilled in the art will recognize that the other 8 directions variances may be calculated in similar ways, due to the reflectional symmetry of the angles chosen. A reflection about the x or y axis, or about the lines x=y or x=−y will resolve the cases shown to the other angle cases.

In general, a selected pixel's variance along a given direction (α) in accordance with the acts of block 430 may be represented as:

$$V(\text{at direction } \alpha) = \Sigma(\text{Individual Variances at } \alpha) \quad \text{EQ. 22}$$

Directional variances calculated in accordance with EQ. 22 when the selected pixel's structure was identified using a small edge test (see block 425, FIGS. 9A-9D and EQS. 7b, 8b, 9b and 10b), will hereinafter be represented as:

$$VSD(\text{at direction } \alpha) = \Sigma(\text{Individual Variances at } \alpha) \quad \text{EQ. 23}$$

In similar fashion, when the selected pixel's structure was identified using a large edge test (see block 425, FIGS. 10A-10D and EQS. 14-17), directional variances will hereinafter be represented as:

$$VLD(\text{at direction } \alpha) = \Sigma(\text{Individual Variances at } \alpha) \quad \text{EQ. 24}$$

One of ordinary skill in the art will understand, given the above discussion and the accompanying figures, how to calculate variance values along the other specified directions. It will also be understood that the values used to modify sums within certain calculations (see, for example, FIG. 13B) are wholly dependent upon the direction along which the variance is being calculated. As such, the equations used to calculate individual variance terms may vary from one implementation to another.

Figure 12A:
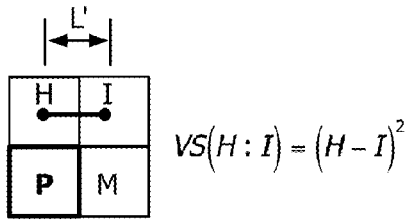
FIGS. 12A-12D illustrate small directional structure tests in accordance with one embodiment of the invention.
Figure 12B:
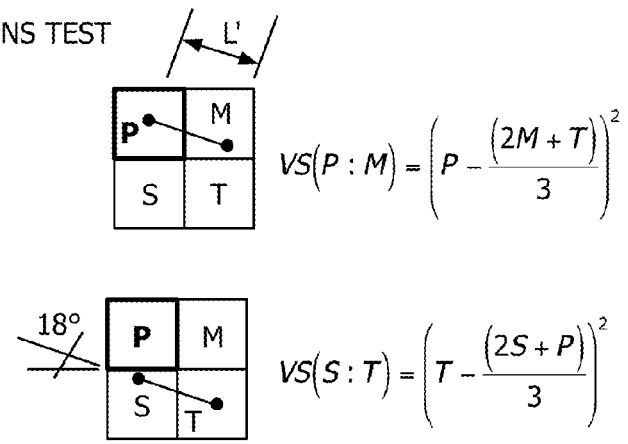
Figure 12C:
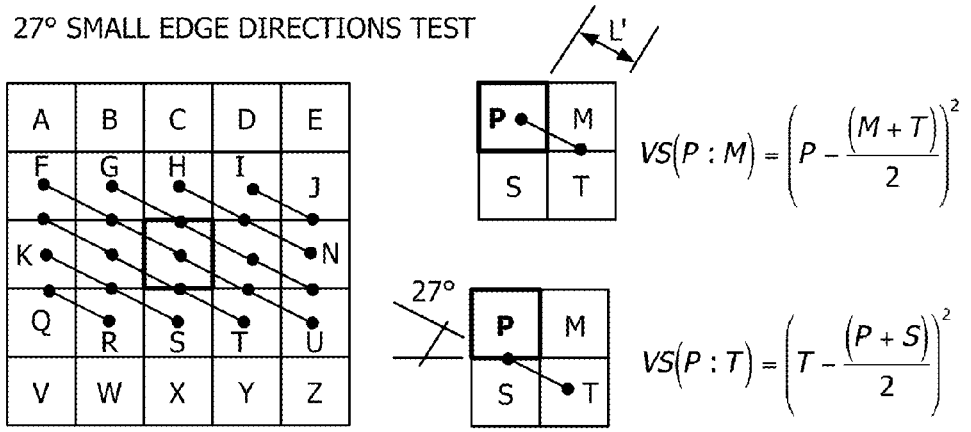
Figure 12D:
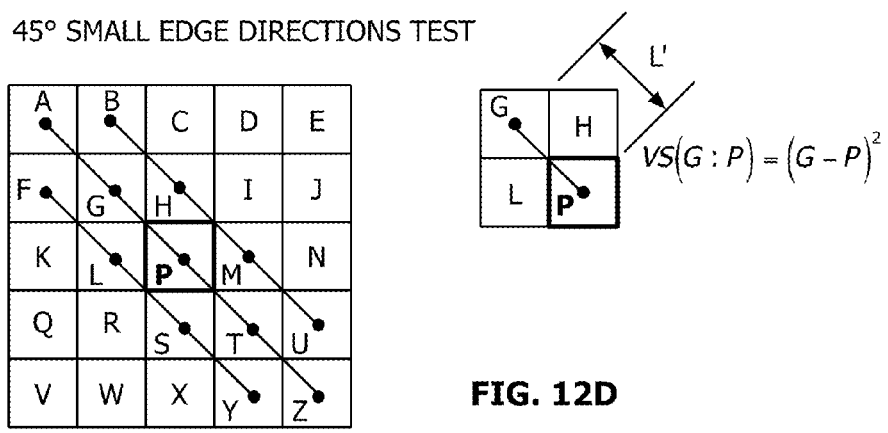

In addition, it will be noted that pixel edge test operations in accordance with block 505 identify 0° using vertical inter-pixel paths (see FIG. 9A), while directional tests at 0° in accordance with block 430 use horizontal inter-pixel paths (see FIGS. 12A and 13A). It will be recognized that this difference is due to the fact that edge tests (e.g., in accordance with block 505) are looking for variance across an edge (which is horizontal) while directional tests (e.g., in accordance with block 430) are designed to detect the direction of minimum variance and, thus, should be aligned with the edge direction in question. (Details of this latter operation are given below.)

Table 1 shows the number of terms and the vector length associated with each total variance value for the illustrative embodiment. The results presented in Table 1 may be derived directly from FIGS. 12A-12D, 13A-13D and the guidelines outlined above. As used herein, the phrase "vector length" refers to the length of the path between pixels along the specified direction and is shown as L' in FIGS. 12A-12D and 13A-13D.

TABLE 1

Directional Structure Test Summary

| Direction | Small Directions Test | | Large Directions Test | |
|---|---|---|---|---|
| | No. Terms | Vec. Length | No. Terms | Vec. Length |
| 0° | 12 | 1.000 | 20 | 1.0 |
| 18° | 16 | 1.054 | 32 | 1.054 |
| 27° | 16 | 1.167 | 32 | 1.167 |
| 45° | 10 | 1.414 | 32 | 1.414 |
| 63° | 16 | 1.167 | 32 | 1.167 |
| 72° | 16 | 1.054 | 32 | 1.054 |
| 90° | 12 | 1.000 | 20 | 1.0 |
| 108° | 16 | 1.054 | 32 | 1.054 |
| 117° | 16 | 1.167 | 32 | 1.167 |
| 135° | 10 | 1.414 | 32 | 1.414 |
| 153° | 16 | 1.167 | 32 | 1.167 |
| 162° | 16 | 1.054 | 32 | 1.054 |

Figure 14:
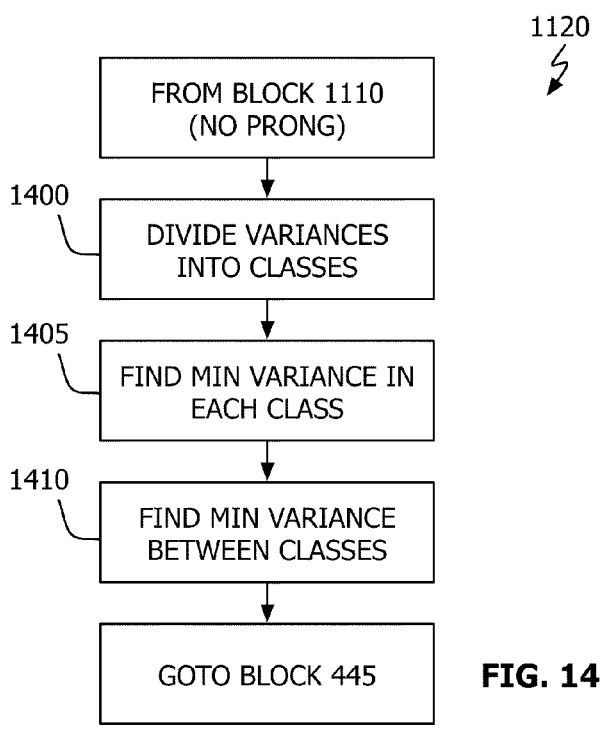
FIG. 14 shows, in flowchart form, acts to determine the direction of structure within an image in accordance with one embodiment of the invention.

Referring to FIG. 14, once variances in accordance with either EQ. 23 or 24 have been determined for each direction (i.e., data provided as a result of falling through the "NO" prong of block 1110), the collected variances may be divided into classes based on the length of their direction vectors (block 1400). Within each class, the minimum variance is selected and the selected variance's associated direction is noted (block 1405). The representative variances from each class may then be compared, with the minimum variance and its associated direction being assigned to the selected pixel (block 1410). The selected pixel's corresponding entry in direction map 440 may be updated to reflect the direction or angle identified during the acts of block 1410 and whether the selected pixel is "small" or "large" as determined during acts in accordance with block 425.

It can be noted that a pixel's variance at a specified angle or direction represents the sum of the squared length differences along a hypothetical edge at that angle. Accordingly, the magnitude of a pixel's variance for a given angle may be influenced by (1) the length of the difference vectors for that angle and (2) the number of squared difference terms for the given angle. Based on this recognition, acts in accordance with block 1400 may group the calculated directional variances in accordance with the length of their difference vectors. For the illustrative example being described herein, Table 2 shows the result of this grouping.

TABLE 2

Illustrative Directional Variance Groupings

| | | | Directions Test | |
|---|---|---|---|---|
| Class | Direction | Vec. Len. | Small No. Terms | Large No. Terms |
| 1 | 0°, 90° | 1.000 | 12 | 20 |
| 2 | 45°, 135° | 1.414 | 10 | 16 |
| 3 | 27°, 63°, 117°, 153° | 1.167 | 16 | 32 |
| 4 | 18°, 72°, 108°, 162° | 1.054 | 16 | 32 |

Angle variances (calculated by the sum of squared difference vectors as described herein) may be freely compared when they have equal difference vector lengths and equal number of terms—i.e., within a class as defined above. For this reason, acts in accordance with block 1405 may simply select the smallest value variance (and its associated angle) from each group, with the variance/angle pair so selected being referred to as a "class representative" variance/angle pair.

With respect to block 1410, when comparing variance values between classes, both the number of terms and difference vector lengths must be accounted for. This may be done by normalizing each variance value to both the number of terms and the difference vector length value. In one embodiment, this may be calculated on a pair-wise basis by computing the ratio between the difference vector length squared times the ratio of the number of terms for the two variances being compared. Thus, when comparing variances between two classes, say class A and class B, the normalization factor when one wants to compare a variance value from class A to a variance value from class B may be computed as:

$$\text{Normalization Factor} = \left(\frac{\text{Length } A}{\text{Length } B}\right)^2 \times \left(\frac{\text{No. Terms } A}{\text{No. Terms } B}\right) \quad \text{EQ. 25}$$

where the comparison is made by comparing the value from class A with the value obtained by multiplying the class B value with the Normalization Factor. One of ordinary skill in the art will understood that the expression given in EQ. 25 describes one of many possible ways of normalizing two factors.

Figure 15A:
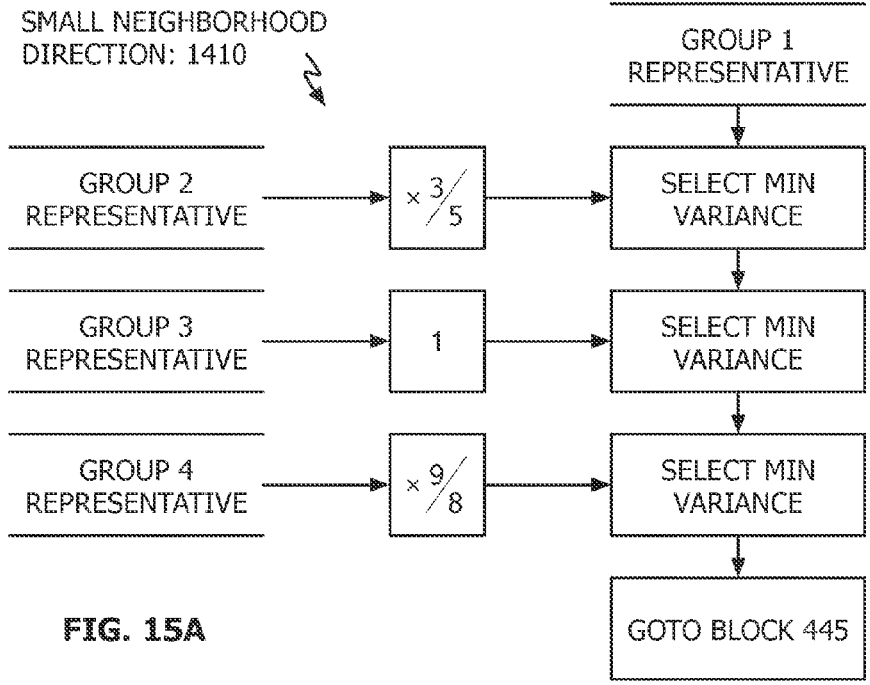
FIG. 15A and 15B show, in flowchart form, methods to determine which direction may be associated with structure about a selected pixel in accordance with one embodiment of the invention.
Figure 15B:
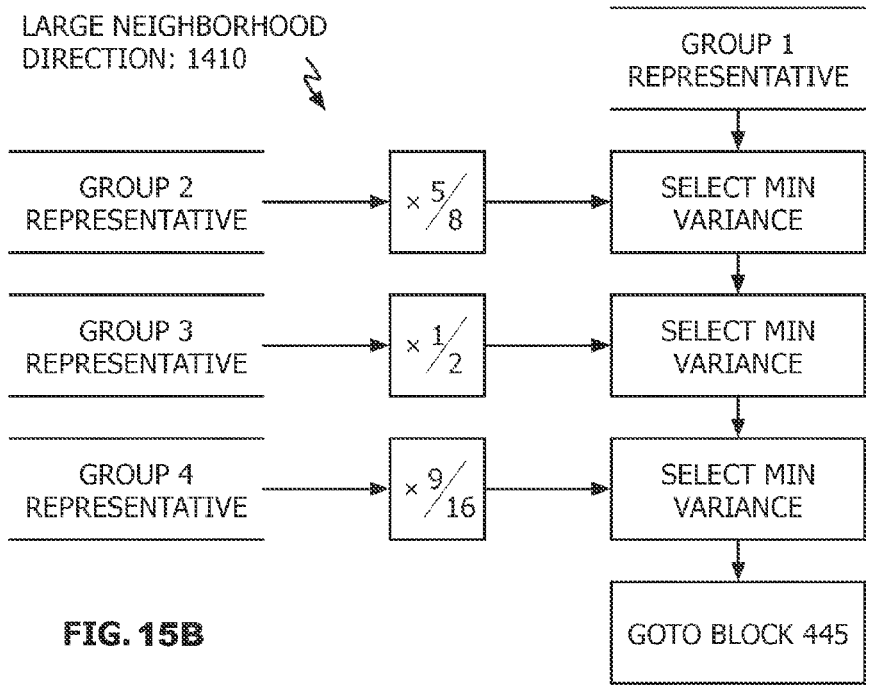

For the illustrative embodiment described herein, operations in accordance with block 1410 are illustrated in FIGS. 15A (when small neighborhood directions were calculated in accordance with FIGS. 12A-12D and EQ. 23) and 15B (when large neighborhood directions were calculated in accordance with FIGS. 13A-13D and EQ. 24). At the completion of acts in accordance with block 1410 (also FIGS. 15A and 15B), the direction or angle associated with the variance having the minimum normalized value and an indication of whether the direction map element is "small" or "large" (as determined during acts in accordance with block 425) is used at block 445.

As previously discussed, direction map 440 comprises a number of elements equal to the number of pixels in image 405. Accordingly, acts in accordance with block 445 update the selected pixel's corresponding entry in direction map 440 to reflect the direction or angle identified during the acts of block 1410 and whether the selected pixel is "small" or "large" as determined during acts in accordance with block 425. Referring again to FIG. 4, the acts described here may be repeated for each pixel in image 405 as indicated at block 450.

Figure 16:
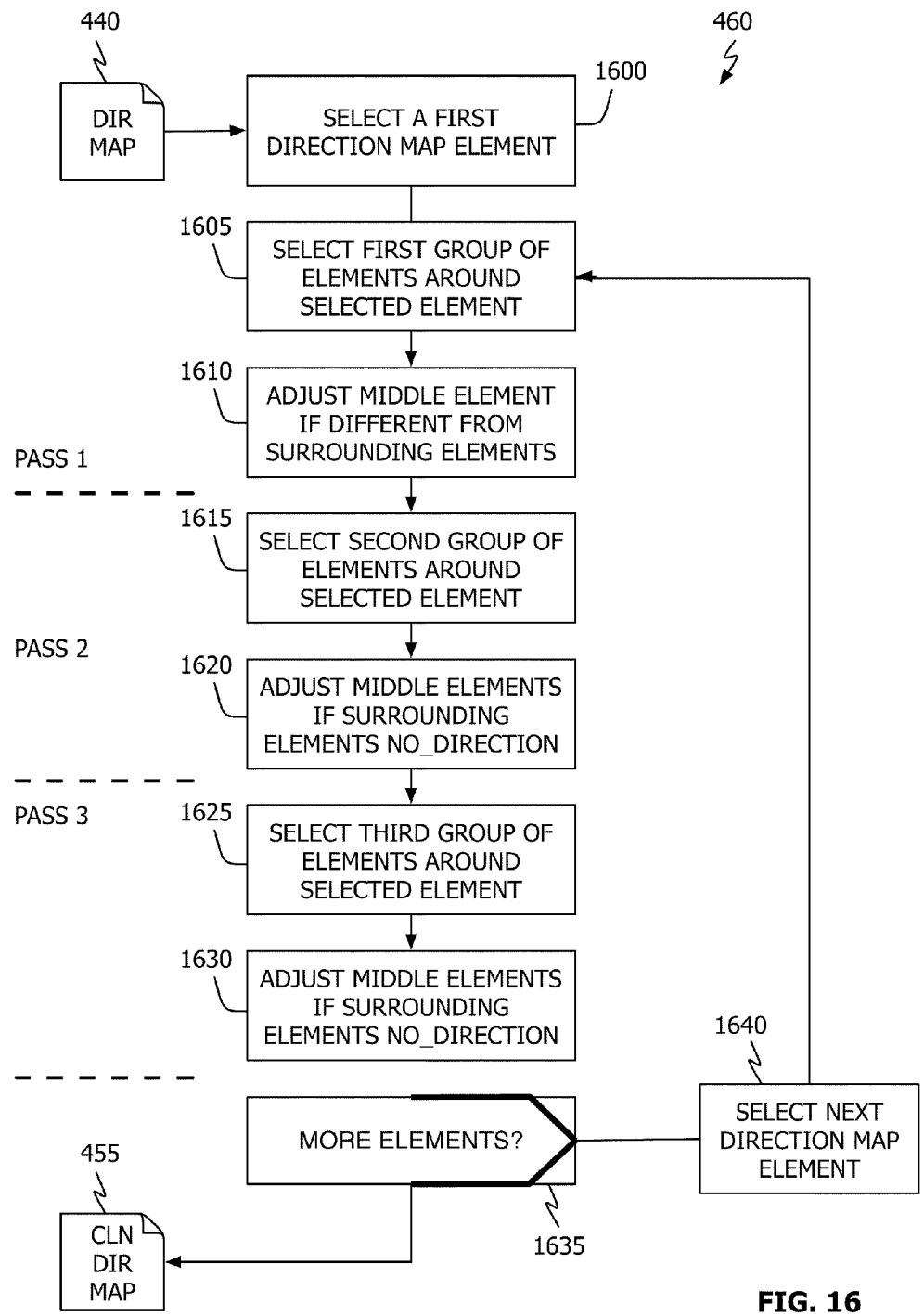
FIG. 16 shows, in flowchart form, a direction map filtering operation in accordance with one embodiment of the invention.

With respect to block 460, it has been found beneficial to despeckle or filter direction map 440 prior to using it to smooth image 405. In one embodiment, direction map 440 may be subjected to a 3-pass filter operation in accordance with FIG. 16. During Pass 1 (blocks 1605 and 1610), individual direction map elements are reset if a small neighborhood of surrounding elements have been assigned a different direction than that of the selected element. During Pass 2 (blocks 1615 and 1620), a larger neighborhood is evaluated around the selected direction map element. If all of the direction elements on the periphery of this larger neighborhood are marked as "no direction" (i.e. no element inside the neighborhood is connected to an element outside the neighborhood), the entire inside of this larger neighborhood me be marked or identified as "no direction." During Pass 3 (block 1625 and 1630) operations similar to those of Pass 2 may be informed, only the selected neighborhood is larger. If additional direction map elements remain to be processed (the "YES" prong of block 1635), the next direction map element is selected (block 1640) whereafter operations continue as before at block 1605. Once all direction block elements have been filtered (the "NO" prong of block 1635) creation of clean direction map 455 is complete. For clarity, one illustrative direction map filtering operation in accordance with FIG. 16 is described via pseudo-code in Table 3.

TABLE 3

Example Direction Map Filtering Pseudo-Code

```
for( each element in direction map 440 )
{
   Pass 1: clean up singleton values
   for( all 3×3 groups of 9 elements in direction map 440 )
   {
      if( 8 surrounding elements are equal )
         if( center element value != surrounding element values )
            center element = surrounding element value
   }
   Pass 2: clear disconnected small regions
   for( all 7×7 groups of 49 elements in direction map 440 )
   {
      if( all 24 surrounding elements = no_direction )
         set middle 25 elements to no_direction
   }
   Pass 3: clear disconnected larger regions
   for( all 15×15 groups of 225 elements in direction map 440 )
   {
      if( all 56 surrounding elements = no_direction )
         set middle 169 elements to no_direction
   }
}
```

With respect to passes 2 and 3, the phrase "surrounding elements" means the $4(n-1)$ pixels along the periphery of the selected n×n neighborhood. In the example implementation shown in Table 3, pass 2 uses a 7×7 neighborhood (n=7) so that the "surrounding elements" comprise 24 elements. Similarly, pass 3 uses a 15×15 neighborhood (n=15) so that the "surrounding elements" comprise 56 elements. In like manner, the phrase "middle" elements are all those elements not one of the "surrounding elements." In general, for any n×n array of direction map elements, there will be $4(n-1)$ elements of the periphery and $(n^2-4n+4)$ elements in the "middle."

In general, operations in accordance with FIG. 16 or Table 3 are provided to minimize the amount of "noise" captured in direction map 440. This may be done by identifying and resetting individual direction map elements all of whose immediate neighbors are a different value (e.g., pass 1). In addition, sufficiently small clusters of direction map elements that identify a specific direction (i.e., not no_direction in accordance with block 435) but which are surrounded by elements indicating no_direction may be presumed to be "noise" and can, therefore, have their value set to no_direction (e.g., passes 2 and 3). In practice, it has been found that large numbers of pixels in image 405 have direction map elements whose value is no_direction. It will be understood that the number of passes, the specific neighborhood sizes set forth in Table 3 and the manner in which the direction map elements were filtered are illustrative only.

Figure 17:
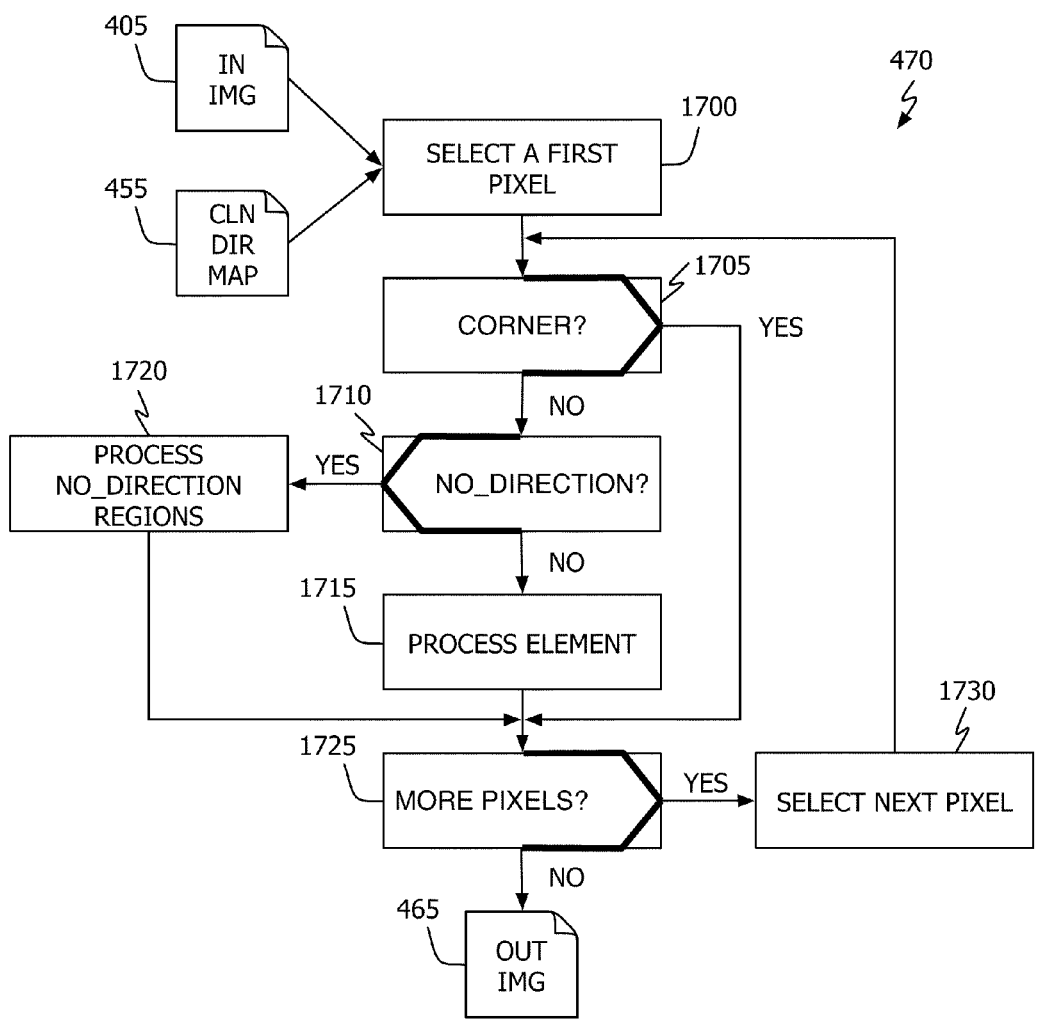
FIG. 17 shows, in flowchart form, an image filtering operation in accordance with one embodiment of the invention.

With respect to acts in accordance with block 470, FIG. 17 outlines one approach for smoothing input image 405. Initially a first pixel from input image 405 and its corresponding direction element from direction map 455 is selected (block 1700). If the selected pixel's corresponding direction map element is not identified as a corner (the "NO" prong of block 1705) or as having no direction (the "NO" prong of block 1710), the pixel element is processed (block 1715). If the selected pixel's corresponding direction map element is not identified as a corner (the "NO" prong of block 1705) but is identified as having no direction (the "YES" prong of block 1710), the pixel element is processed as a "no_direction" pixel (block 1720).

Once the selected pixel has been processed as having a specific direction (block 1715), no direction (block 1720) or as being part of a corner structure (the "YES" prong of block 1705), a check is made to determine if image 405 has pixels that have not been processed in accordance with blocks 1705-1720. If additional pixels remain to be processed (the "YES" prong of block 1725), the next pixel and corresponding direction map element are selected (block 1730), whereafter processing continues at block 1705. If all pixels in image 405 have been processed (the "NO" prong of block 1725), generation of output image 465 is complete.

Figure 18:
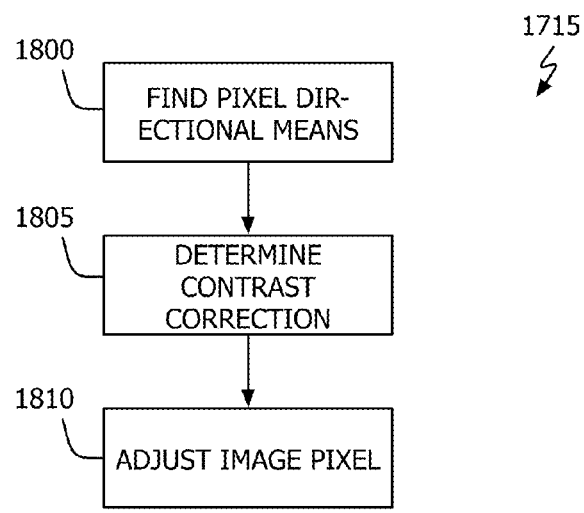
FIG. 18 shows, in flowchart form, a pixel processing operation in accordance with one embodiment of the invention.

With respect to the acts of block 1715, FIG. 18 outlines one approach to process image pixel elements in accordance with the invention. Initially, directional means are determined for the selected pixel (block 1800). In one embodiment, a mean about the selected pixel's direction is determined and is used to reduce the noise at the pixel while also preserving structure at the pixel (block 1805). In addition, a mean perpendicular to the selected pixel's direction is determined and is used to restore any contrast that may be lost when directional smoothing is performed. Once directional and perpendicular means are determined, input image 405 may be smoothed (block 1810).

Directional means in accordance with block 1800 may be determined by applying weighting factors to each selected pixel's neighborhood and averaging the results. For example, pixels identified as "small," may use a weighting vector $$\left[\frac{1}{4} \quad \frac{2}{4} \quad \frac{1}{4}\right].$$

In like fashion, pixels identified as "large" may use a weighting factor $$\left[\frac{1}{16} \quad \frac{4}{16} \quad \frac{6}{16} \quad \frac{4}{16} \quad \frac{1}{16}\right].$$

One of ordinary skill in the art will recognize these weighting factors implement a digital approximation to a small Gaussian blur—"small" pixels using a 3-pixel range and "large" pixels using a 5-pixel range. It will also be recognized by those of ordinary skill that other averaging operators may be used.

Using the neighborhood layout first presented in FIG. 8, letting $M1(p$ at $\alpha)$ represent the directional mean at pixel p along the specified direction $\alpha$ and $M2(p$ at $\alpha)$ represent the directional mean at pixel p perpendicular to the specified direction $\alpha$, FIGS. 19A-19F present illustrative calculations for the embodiment begun above. Those of ordinary skill in the art will recognize, in light of this disclosure, that the variances of the other eight directions may be calculated in similar ways (due to the reflectional symmetry of the angles as noted above).

It will be recognized that for the 12-direction embodiment discussed here, the following equivalence relationships exist: $M1(p$ at $0°)=M2(p$ at $90°)$; $M1(p$ at $90°)=M2(p$ at $0°)$; $M1(p$ at $18°)=M2(p$ at $108°)$; $M1(p$ at $108°)=M2(p$ at $18°)$; $M1(p$ at $27°)=M2(p$ at $117°)$; $M1(p$ at $117°)=M2(p$ at $27°)$; $M1(p$ at $45°)=M2(p$ at $135°)$; $M1(p$ at $135°)=M2(p$ at $45°)$; $M1(p$ at $63°)=M2(p$ at $153°)$; $M1(p$ at $153°)=M2(p$ at $63°)$; $M1(p$ at $72°)=M2(p$ at $162°)$; and $M1(p$ at $162°)=M2(p$ at $72°)$ With respect to the acts of block 1805, one illustrative contrast correction factor M3 may be made by altering the directional mean M1 as follows:

$$M3(\alpha)=M1(\alpha)+[M1(\alpha)-M2(\alpha)]\times CF(d) \quad \text{EQ. 26}$$

where $M1(\alpha)$ and $M2(\alpha)$ represent directional variance means at the specified angle $\alpha$ discussed above and illustrated in FIGS. 19A-19F and CF(d) represents a contrast factor assigned to the selected pixel's corresponding direction map element.

As to factor CF(d), it is noted that since some angles require more interpolation to produce their M1 and M2 values than others, these angles will also produce softer results. It has been found that the amount of interpolation required also varies along the same lines as the angle classes. Thus, only one contrast factor per angle class is needed. In one embodiment, the value of CF(d) is empirically determined and fixed for angle $\alpha$ and directional variance angle class shown in Table 2. Specific values for CF(d), determined using visual inspection of the results on a "target" test chart include: 0.4 for angle class 1; 0.4 for angle class 2; 0.6 for angle class 3; and 0.8 for angle class 4.

With respect to the acts of block 1810, the selected pixel's M3 value may be used to smooth pixel p as follows:

$$p(\text{smoothed})=p+[M3(\alpha)-p]\times SF \quad \text{EQ. 27}$$

where SF represents a smoothing factor. In accordance with EQ. 27, if SF=0, p(smoothed)=p(no smoothing). If, on the other hand, SF=1, pixel p is said to be totally smoothed. In practice, it has been found that a smoothing factor of approximately 0.5 yields visually appealing images. Using a SF=0.5 has been found to reduce the noise associated with the pixel p by approximately 6 db. One of ordinary skill in the art will recognize that other smoothing factor values may be used depending upon the desired result.

For clarity, one illustrative image smoothing operation in accordance with block 470 is described via pseudo-code in Table 4.

TABLE 4

Example Input Image Filtering Pseudo-Code

```
for( all pixels p in image and its corresponding direction
map element )
{
if( d = "no_direction" )
   {
   if( 3×3 of surrounding d's are no_direction )
      apply a large blur to p
   else
      apply a small blur to p
   }
else if( d = "corner" )
   do nothing
else // d indicates a specified direction
   {
   if( d is "large" )
      {
      M1 = directional mean of p at its specified direction
         using a small neighborhood
      M2 = directional mean of p perpendicular to its specified
         direction using a small neighborhood
      }
   else // d is "small"
      }
      M1 = directional mean of p at its specified direction
         using a large neighborhood
      M2 = directional mean of p perpendicular to its specified
         direction using a large neighborhood
      }
   // Determine value to improve contrast after filtering
   Diff= M1 – M2
```

TABLE 4-continued

Example Input Image Filtering Pseudo-Code

```
        M3 = M1 + (diff × CF[ d ])
        // Smooth input image pixel p
        Store p + (M3 − p) × SF
    }
}
```

Figure 20A:
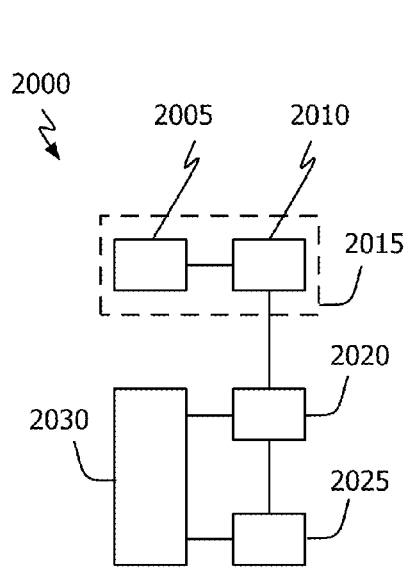
FIGS. 20A and 20B show, in block diagram form, illustrative environments in which methods in accordance with this disclosure may be used.

In one embodiment, image processing techniques in accordance with this disclosure may process YCbCr or Y'Cb'Cr' image data. It will be recognized image processing on this type of data is typically used in embedded environments (e.g., mobile phones, personal digital assistant devices and other portable image capture devices). Referring to FIG. 20A, illustrative commercial product 2000 comprises sensor unit 2005, image capture circuitry 2010 (both contained in a hardware image sensor package 2015), memory 2020, processor unit 2025 and circuitry 2030 for carrying out the functions of the particular commercial product. In these types of environments, it is common to operate directly on luminance (Y or Y') data right after de-Bayering operations. It is further noted that in embedded environments, image processing in accordance with this disclosure may be implemented directly in silicon. In these implementations, it would be common to operate directly on an image's reconstructed green channel after de-Bayering but before lens correction.

Figure 20B:
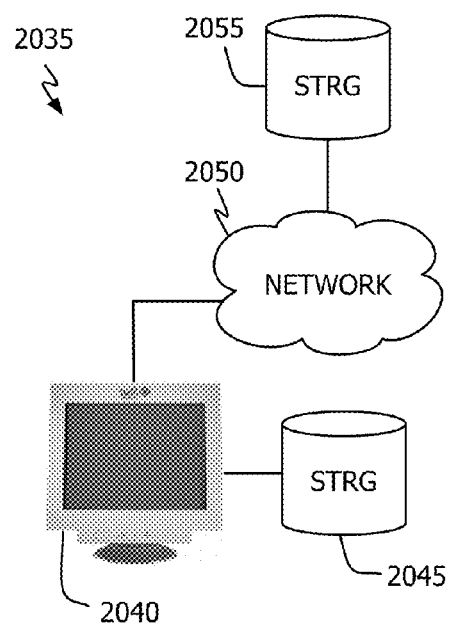

In another embodiment, image processing techniques in accordance with this disclosure may process RAW image data. It will be recognized that RAW image processing is typically used in non-embedded environments (e.g., stand-alone workstations, desktop and laptop computer systems). Referring to FIG. 20B, illustrative computer system 2035 comprises desktop computer system 2040, local storage unit 2045, network 2050 and remote storage unit 2055. As illustrated here, network 2050 provides the ability for desktop unit 2040 to communicate with remote storage unit 2055. It will be understood, that network may include a private or local area network, a wide area network such as the Internet or combinations of local and wide area networks. In addition, network 2050 may include wired and wireless networks. In these types of environments, desktop unit 2040 may be programmed to perform operations in accordance with this disclosure. In non-embedded environments, smoothing operations in accordance may occur after green reconstruction but before red, green and blue channel data are combined to form a single RGB image.

In this disclosure, operations have been described in terms of neighborhoods centered about a selected pixel (for an image) or element (for a direction map). It will be recognized that pixels (elements) at the edge of an image (direction map) do not have surrounding pixels (elements). These conditions are often referred to as boundary conditions. In such circumstances, one of ordinary skill in the art will recognize that there are a number of different approaches that may be taken to "fill in" neighborhood pixels (elements). In a first approach, pixels (elements) within the image (direction map) are simply duplicated across the edge. For example: pixels (elements) on the edge are duplicated to create a temporary row or column of pixels (elements); pixels (elements) one row or column away from the edge may then be duplicated to create a second row or column of pixels (elements). This process may be repeated until the needed number of row or column elements have been filled in. In another embodiment, pixels (elements) that do not physically exist may be assumed to have zero values. While only two techniques to fill in missing pixel(element) values have been described here, those of ordinary skill will recognize many others are possible.

Various changes in the materials, components, circuit elements, as well as in the details of the illustrated operational methods are possible without departing from the scope of the following claims. For example, not all steps of operations outlined in FIGS. 4-6, 11 and 14-18 need be performed. By way of example, direction map filtering in accordance with block 460 need not be performed. Similarly, operations represented as one act or block, may be combined with other operations or further divided—as the implementer so chooses. In addition, acts in accordance with FIGS. 4-6, 11 and 14-18 may be performed by a programmable control device (e.g., elements 2015, 2025 and 2040) executing instructions organized into one or more program modules. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Storage devices suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

The invention claimed is:

1. An image processing method, comprising:
    obtaining an input image comprising pixels, each pixel having a value;
    determining if structure exists in the input image at one or more pixels by:
        applying, at each of the one or more pixels, a first test using a first number of pixels to disambiguate structure from noise, and
        applying, at each of the one or more pixels, a second test using a second number of pixels to disambiguate structure from noise if the first test fails;
    creating a direction map, the direction map having elements, the elements having a one-to-one correspondence with the pixels of the input image;
    identifying, based, at least in part, on the direction map, a direction of structure at one or more of the pixels at which structure was determined to exist, wherein the act of identifying comprises: identifying that no structure exists at a first set of the pixels; identifying that a corner structure exists at a second set of the pixels; and identifying a direction of structure that exists at a third set of pixels;
    updating elements in the direction map corresponding to each of the first set of pixels to reflect the identified no direction structure;
    updating elements in the direction map corresponding to each of the second set of pixels to reflect the identified corner structure; and
    updating elements in the direction map corresponding to each of the third set of pixels to reflect the identified direction of structure; and
    transforming the input image into an output image by filtering the input image according to the direction map.

2. The method of claim 1, wherein the act of obtaining an input image comprises obtaining a YCbCr format input image.

3. The method of claim 2, wherein the acts of identifying and transforming comprise identifying and transforming a Y channel of the input image.

4. The method of claim 1, wherein the act of obtaining an input image comprises obtaining a RGB format input image.

5. The method of claim 4, wherein the acts of identifying and transforming comprise identifying and transforming one or more R, G and B channels of the input image.

6. The method of claim 1, wherein the act of filtering the input image comprises:
filtering the first set of pixels in a first way;
filtering the second set of pixels in a second way; and
filtering the third set of pixels in a third way.

7. The method of claim 6, wherein the act of filtering in a first way comprises blurring each pixel value in the first set of pixels.

8. The method of claim 6, wherein the act of filtering in a first way comprises updating each pixel value in the first set of pixels based on image pixel values surrounding each of the first set of pixels.

9. The method of claim 6, wherein the act of filtering in a second way comprises leaving unprocessed pixels in the second set.

10. The method of claim 6, wherein the act of identifying a direction of structure at a third set of pixels comprises identifying one direction from a predetermined set of directions for each of the third set of pixels.

11. The method of claim 10, wherein the predetermined set of directions comprise more than 4 directions.

12. The method of claim 10, wherein the act of filtering in a third way comprises filtering each pixel in the third set along the identified direction for the respective pixel.

13. The method of claim 12 further comprising adjusting one or more pixel values in the third set of pixels to enhance contrast of the one or more pixels.

14. The method of claim 6, wherein a degree to which each pixel in the first set of pixels is blurred is based on image pixel values surrounding the respective pixel.

15. The method of claim 6, wherein filtering in a third way comprises applying a smoothing factor to each pixel value in the third set of pixels.

16. The method of claim 6, wherein the act of updating elements in the direction map corresponding to a third set of pixels comprises updating said direction map elements to identify one direction from a predetermined set of directions for each of the third set of pixels.

17. The method of claim 16, wherein the predetermined set of directions comprises more than 4 directions.

18. The method of claim 6, wherein the act of transforming further comprises, before the acts of filtering first, second and third sets of pixels, updating each element in the direction map having a value that is different from a value of immediately surrounding elements in the direction map.

19. The method of claim 18, further comprising updating a first plurality of elements in the direction map having a value that is different from a value of elements immediately surrounding the first plurality of elements.

20. The method of claim 1, wherein the act of transforming further comprises filtering the input image along a direction perpendicular to the identified direction of the structure at the one or more pixels.

21. A computer programmed to perform the image processing method of claim 1.

22. A non-transitory program storage device, readable by a programmable control device, comprising instructions stored on the program storage device for causing the programmable control device to perform the method of claim 1.

23. A system comprising:
a memory; and
a processor,
wherein the memory has stored therein an input image and instructions for causing the processor to perform the method of claim 1.

24. The system of claim 23, wherein the system comprises a stand-alone computer system.

25. The system of claim 23, wherein the system comprises a hand-held consumer device.

26. The system of claim 23, wherein the system comprises a mobile telephone.

27. A computer system programmed to perform an image processing method, the method comprising:
obtaining an input image comprising pixels, each pixel having a value;
for each of a plurality of pixels—
performing one or more tests for structure, each test at a different resolution,
determining, after each of said one or more tests, if structure was detected and performing a successive test only if a current test fails to detect structure,
recording there is structure at the pixel only if a test determines there is structure, and
recording there is no structure at the pixel if all of the one or more tests fail to determine there is structure at the pixel;
identifying, for each pixel at which structure was detected, a direction for the detected structure and whether the pixel is part of a corner structure;
creating a direction map, the direction map having elements, the elements having a one-to-one correspondence with the pixels of the input image;
updating elements in the direction map corresponding to each of a first set of pixels for which no structure was recorded;
updating elements in the direction map corresponding to each of a second set of pixels identified as being part of a corner structure;
updating elements in the direction map corresponding to each of a third set of pixels to reflect the identified direction for the detected structure; and
transforming the input image into an output image by filtering the input image, according to the direction map.

28. The computer system of claim 27 wherein the act performed by the computer system of identifying comprises:
identifying a corner direction for at least one pixel identified as being part of a corner structure; and
identifying a specific direction from a set of predetermined directions for at least one pixel.

29. The computer system of claim 28 wherein the act performed by the computer system of filtering the input image comprises:
filtering image pixels at which no structure was recorded in a first way;
filtering image pixels at which a corner structure was identified in a second way; and
filtering image pixels at which a specific direction was identified in a third way.

30. The computer system of claim 29 wherein the act performed by the computer system of filtering in a second way comprises leaving the pixels unchanged during the act of filtering the input image.

31. The computer system of claim 27, wherein the act performed by the computer system of filtering in a first way comprises updating each pixel value in the first set of pixels based on image pixel values surrounding each of the first set of pixels.

32. The computer system of claim 27, wherein the act performed by the computer system of filtering in a third way comprises filtering each pixel in the third set along the identified direction for the respective pixel.

33. The computer system of claim 32, wherein the act performed by the computer system of filtering in a third way further comprises adjusting one or more pixel values in the third set of pixels to enhance contrast of the one or more pixels.

* * * * *

UNITED STATES PATENT AND TRADEMARK OFFICE
CERTIFICATE OF CORRECTION

PATENT NO. : 8,861,885 B2
APPLICATION NO. : 12/547634
DATED : October 14, 2014
INVENTOR(S) : Mark Zimmer Page 1 of 1

It is certified that error appears in the above-identified patent and that said Letters Patent is hereby corrected as shown below:

In the Claims

Column 19, Line 40 (Claim 14, line 1) replace "claim 6" with --claim 7--;

Column 21, Line 1 (Claim 31, line 1) replace "claim 27" with --claim 29--;

Column 21, Line 6 (Claim 32, line 1) replace "claim 27" with --claim 29--.

Signed and Sealed this
Seventeenth Day of February, 2015

Michelle K. Lee
*Deputy Director of the United States Patent and Trademark Office*